June 22, 1937. A. SCHMIDT 2,084,538
COLORIMETER
Original Filed May 2, 1934 2 Sheets-Sheet 2
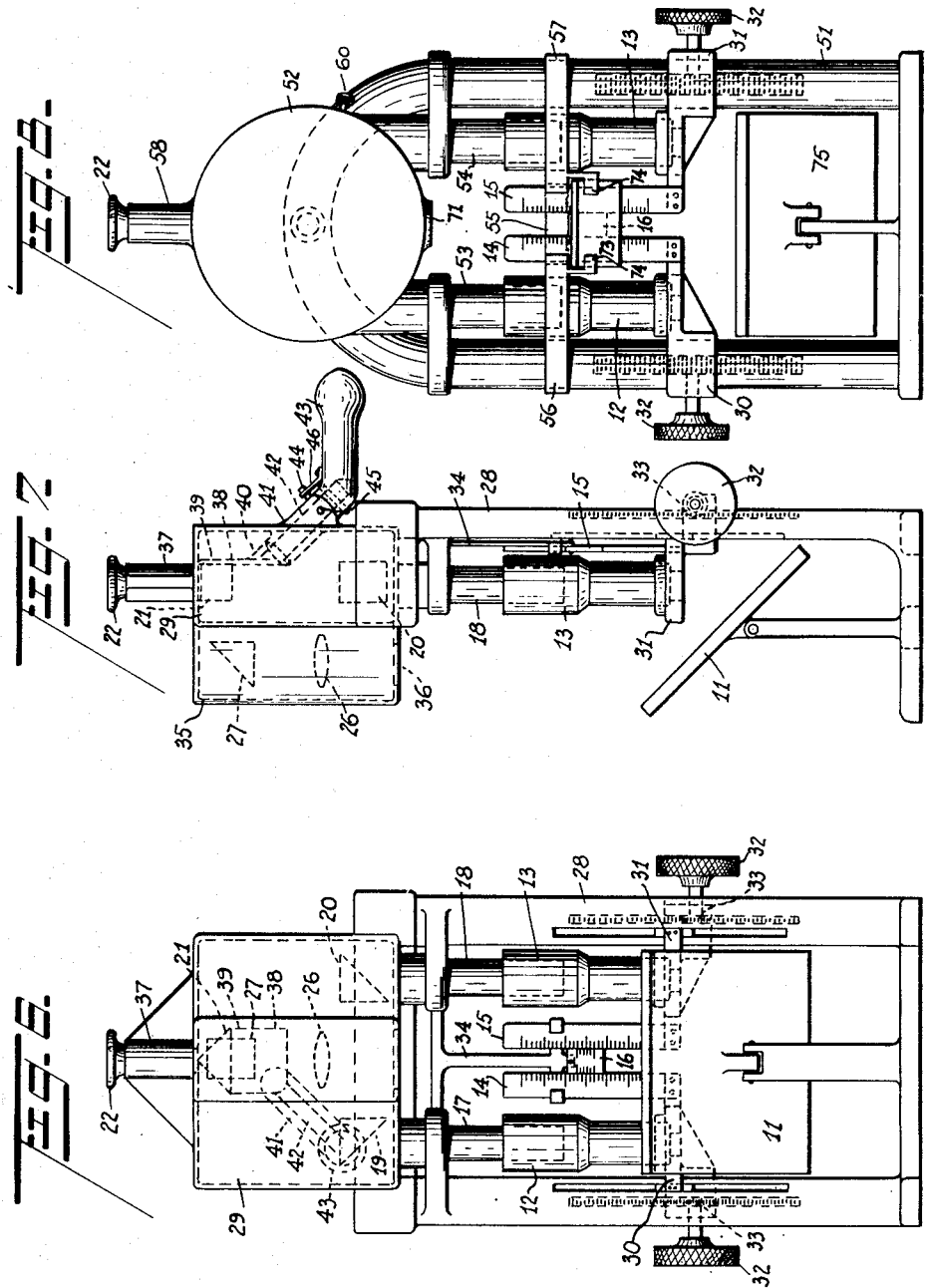
INVENTOR.
Arno Schmidt.
BY
ATTORNEY.

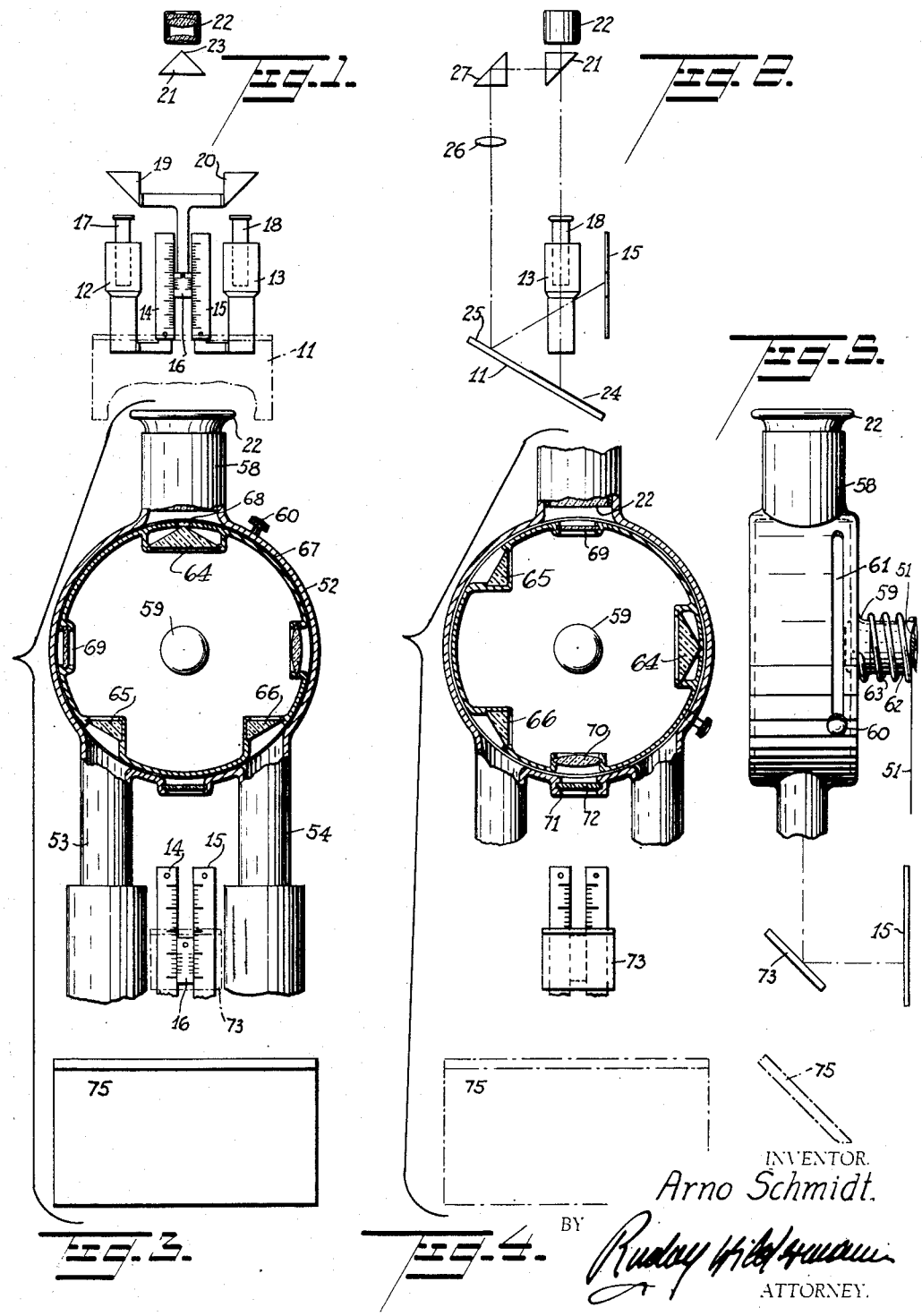

Patented June 22, 1937

2,084,538

UNITED STATES PATENT OFFICE 2,084,538

COLORIMETER

Arno Schmidt, New York, N. Y.

Application May 2, 1934, Serial No. 723,494
Renewed October 26, 1936

16 Claims. (Cl. 88—14)

This invention relates to colorimeters, and primarily to improvements in the optical arrangement of such instruments. It refers to colorimeters of the type in which the colors to be compared are brought into the field of vision of one eye, so that the comparison may be carried through conveniently and accurately.

The prior art has resorted to optical conduits for the purpose of adducing the beams of light passing through spaced samples to one eye piece. Such conduits were systems of prisms, for instance rhombic prisms, which substantially touched each other at a dividing line, and the colors were seen on opposite sides of said line.

In order to reduce the dividing line to a minimum, a single prism was resorted to, an edge of which faced the eye piece, representing the dividing line and could be executed as an extremely fine hair line. Prisms of the latter type were executed solid and had to be made rather bulky in order to bring the light passing through the spaced samples within the field of the eye piece. In order to reduce the bulk of a solid prism to a minimum, considerable refraction was resorted to, so that the inclined faces at the dividing line in front of the eye piece were, for instance, disposed at 60°, and the faces through which the light beams entered upon the prism were similarly inclined. On the other hand it is known that such steeply inclined prism faces do not yield the best results for comparison and such solid prisms involve the disadvantage that the sides are reversed in the field of vision.

Now it is well known that a greater refraction may be obtained by interposing a coacting thinner medium, air for instance.

Another object of my invention provides therefor for separate prisms instead of one larger prism; they may be made more economically and allow an adjustment in their position.

Another object of this invention is to compensate for the reversal of the colors compared within the field of vision of the observer by also reversing the respective scales. Preferably I do not actually reverse the scales but I bring about the reversal by interposing optical reversing means.

An important object of this invention provides for ready exposure of the observer comparing the colors.

More particularly I provide simple means substituting at will the scale for the colors in the field of view of the observer. Following out the suggestion of the last object I also arranged the colorimeter in such a way that observations and handling of the samples may be all brought about on one side of the colorimeter, thus generally enhancing the convenience of operation.

These objects of my invention and others explained in the following may be obtained in various ways, two representative modifications being described and illustrated by the accompanying drawings in which Figs. 1 and 2 show schematic front and side views of a preferred optical arrangement for a colorimeter; the prisms are in alternative positions in the two views.

Fig. 3 shows a sectioned detail view of another modification.

Fig. 4 shows a corresponding view in which the optical parts are shifted into an alternate position.

Fig. 5 shows a detail side view relating to the showing of Fig. 4.

Figs. 6 and 7 show front and side views, respectively, of a colorimeter built upon the principle of the diagrams of Figs. 1 and 2.

Fig. 8 shows the front view of an assembled colorimeter involving the arrangement of Figs. 3, 4 and 5.

Similar numerals refer to similar parts throughout the various views.

The colorimeter outlined in Figs. 1 and 2 comprises a reflector 11 which trains light onto the liquids to be compared and contained in the cups 12 and 13. In accordance with the prior art these cups are relatively adjustable and adjustable in relation to the apparatus, their relative positions and their position in relation to the apparatus being indicated by the respective scales 14 and 15 in relation to a fixed indicator or scale which is shown as a vernier 16. In accordance with this art, stationary plungers 17 and 18 extend into the cups 12 and 13, respectively, and are fixedly arranged in relation to the apparatus and to the optical parts disposed thereabove. The optical parts comprise the prisms 19, 20, and 21, the prisms 19 and 20 facing the plungers 17 and 18 respectively, and converging the light passed therethrough into the prism 21. Above the right and left top sides, respectively, of the prism 21, the light coming from the cups 12 and 13 passes in an upward direction. Facing the prism 21 is arranged an eye piece 22 which is vertically adjustable, or its upper lens is vertically adjustable, so that it may be focused. Preferably this eye piece is focused upon the top edge 23 of the prism 21, the dividing or hair line.

The prisms are all indicated as rectangular prisms. Thus an improved view is afforded through the eye piece 22.

Since the prisms 19 and 20 are spaced from the prism 21 and the light passes therebetween through a thinner medium, the air, a greater refraction is brought about between the prisms 19 and 20, and the prism 21 so that their relative arrangement is just about the same as if a solid 60° prism were substituted for the three separate 90° prisms.

In the side view of Fig. 2, the prism 21 is shown to be turned into a position different from the position of Fig. 1. The said prism has been swung around a vertical axis, and has then been tilted, so that its hypotenuse is disposed at 45°. It will be seen from the arrangement of Figs. 6 and 7 that a suitably inclined axis may be chosen around which prism 21 swings from the position of Fig. 1 into the position of Fig. 2.

In Fig. 2 one of the sides of the prism 21 is in a level position at the top and preferably disposed slightly below the focal point of the eye piece 22.

Whereas the portion 24 of reflector 11, which supplies the light passing through the cups 12 and 13 may be dull, so that it supplies a diffused light, the remaining part thereof, as at 25, is finished as a mirror so that a picture of the scales 14, 15, 16 is reflected thereby in an upward direction through a lens 26 into a prism 27, and from there by way of the prism 21 into the eye piece.

The object of the lens 26 is twofold and for either purpose or for both other means known in the optical arts may be substituted.

One of these objects is to reverse the scales 14 and 15 as seen through the eye piece 22 so that they correspond as to the sides, on which they are seen through the eye piece, to the reversed arrangement of the colors seen through the eye piece on both sides of the edge 23. The second object of the lens 26 is to bring about a preferred adjustment of the enlargement of scales 14, 15 and vernier 16 as seen through the eye piece 22. If, for instance, the enlargement of the eye piece 22 is ten-fold, and thus offers a clear vision of the colors compared by way of the system of Fig. 1, such enlargement may be too great for the scales 14, 15 and vernier 16, because not enough thereof would be seen to render intelligible the observations through an eye piece in the alternate position of Fig. 2. It may therefore be advisable to reduce by way of lens 26 the enlargement of the scales 14, 15 and vernier 16 as seen through eye piece 22; at least the vertical extent of the vernier should be visible at all times. The lens 26 may in that instance be shaped to yield at the eye piece a 5 to 1 enlargement, of the scales only, and it is therefore shown to be arranged at approximately ⅓ the optical distance between the focal point of the eye piece 22 and the scales 14, 15 and vernier 16.

An apparatus used for the diagrammatic layout of Fig. 2 is shown in Figs. 6 and 7. The frame 28, the optical housing 29, the plungers 17 and 18, the vernier 16, and the reflector 11 are relatively fixedly mounted; the frame 28 is executed in bifurcation, so as to permit light from the back to pass to the reflector 11 and to be diffusedly reflected through the standard and reference samples contained in the cups 12 and 13. In the manner known in the art, the cups 12 and 13 are replaceably supported upon carriages 30 and 31, each of which may be vertically adjusted by means of the knob 32 of a rack and pinion mechanism 33. The scales 14 and 15 are mounted upon the carriages 30 and 31, respectively, and are suitably retained in alignment with the stationary vernier 16. For that purpose a bracket 34 is arranged upon the frame 28 and the vernier 16 is mounted upon the lower end of said bracket.

The lower prisms 19 and 20 are mounted in the optical housing 29 and are ordinarily retained in the same position. In a frontward extension 35 of housing 29 are mounted the prism 27 and the lens 26. An opening 36 in the bottom of extension 35 may be provided with a suitable window so that the housing 29 is closed. Through the said opening 36 the scales are observed from the eye piece 22, when the prism 21 is in the position of Fig. 2. The eye piece 22 is vertically adjustably mounted in a sleeve 37 which upwardly extends from the optical housing 29.

The prism 21 is attached to a bracket 38 which comprises a plate 39 with a lug 40. From the lug 40 a suitably inclined shaft 42 extends through a bearing 41 which forms part of the optical housing 29; a lever 43 is mounted upon the free end of shaft 42. Stops and locks may be provided for, which limit the movement of lever 43, so that in one extreme position the prism 21 is disposed in the positions of Figs. 1, 6 and 7, whereas in the other extreme position the prism 21 is disposed as shown in Fig. 2. Thus I indicate in the drawings pins 44 and 45 on bearing 41, upon which alternately may abut a pointer 46 mounted on lever 43.

The side of the prism 21 turned away from plate 39 may be blackened, so that the light reflected by mirror 11 into the optical housing 29 by way of opening 36, lens 26 and prism 27, does not interfere when the color observations are made, while the prism 21 is in the position of Figs. 1, 6 and 7.

If the operator has made his color comparison by adjusting knobs 32, he may swing the lever 43 into the alternative position, whereupon the picture of the scales 14, 15 and vernier 16 is projected from the prism 27 through the turned prism 21 into the eye piece 22 and is read by the observer.

The remaining Figs. 3, 4, 5, and 8 show a modified colorimeter incorporating my invention. As seen from Fig. 8 we have in this instance again an arched frame 51, upon which are fixedly mounted the housing 52, from which depend the plungers 53 and 54 and the vernier 16, the latter one by way of a cross-piece 55. The cups 12 and 13 may be raised and lowered upon the risers 51 on carriages 30 and 31, respectively, by an arrangement similar to that of Figs. 6 and 7. The cups 12 and 13 and the scales 14 and 15 may be guided in their vertical movement by suitable shelves 56 and 57 which extend from the risers of the frame 51. The optical housing is revolvable in this instance, or an outer housing 52 may be fixedly arranged as shown, containing a rotatable optical system by which alternative positions of the optical parts are provided for.

For that reason, the housing 52, which carries the eye piece 22 in a suitable extension 58, is shown to be hollow and open in the back and a rotor 59 extends into the said housing from the frame 51. The housing 52 is provided with a slot through which extends a knob 60 mounted upon the rotor 59. The slot 61 is of such length, that the knob 60 may move therein from the normal position of Fig. 3 into an alternate position shown in Figs. 4, 5 and 8. The rotor is retained in the normal position of Fig. 3 by the spring 63 coiled upon the hub 62, one end of said spring being fastened upon the rotor 59, the other one upon the frame 51 from which extends the said hub 62. In the rotor are mounted the 120° prism 64 and the 30° prisms 65 and 66, said prisms corresponding to the prisms 21, 19 and 20, of Fig. 1. Said prisms of Fig. 3 are vertically further spaced apart than the prisms 21, 19 and 20, because there is less refraction in this instance. In the position of the rotor 59 shown in Fig. 3, the prism 64 is aligned with the eye piece 22 and the prisms 65 and 66 are arranged with the plungers 53 and 54. The cylindrical wall 67 of rotor 59 has an opening 68, said opening representing a diaphragm suitably framing the divided color sections seen through eye piece 22.

In case an analogous diaphragm is not mounted in a housing 29 of Figs. 6 and 7, or forms part of the eye piece, it may be provided there as a hole in a horizontal extension of the top of wall 39 as well understood by those acquainted with the art.

When the rotor is shifted to the alternative position of Figs. 4, 5 and 8, a larger hole or diaphragm 69 faces the eye piece, and the observer looks by way of said hole 69 through a lens 70, which is mounted in the cylindrical part 67 of the rotor 59. The said lens 70 corresponds to the lens 26 of Figs. 1, 2, 6 and 7, and serves for the observation of the scales 14, 15 and the vernier 16.

For that purpose an opening 71 is provided in the optical housing 52 which may be suitably closed by a window 72. Underneath the opening 71 is provided a mirror 73, which is mounted at an angle of 45° on extensions 74 of the shelves 56 and 57. The mirror 73 is on a level with the vernier 16 so that the scales 14 and 15 and the vernier 16 are projected by the mirror 73 through lens 70 into the eye piece 22.

After the observer has made his color comparison while the parts are in the position of Fig. 3, he shifts the rotor into the position of Figs. 4, 5 and 8 and may then read the scales 14, 15 and the vernier 16.

The reflector providing the light for the color comparison may be arranged separately in this instance. Such an adjustable reflector is shown at 75.

While I have described my invention in detail in respect to two modifications, yet I do not wish to be limited thereby, except as the state of the art and the appended claims may require, for it is obvious that various changes may be made in the form of embodiment of my invention, without departing from the spirit and scope thereof.

What I claim is:

1. In a colorimeter, a frame, an eye piece mounted on said frame for receiving the light from the color samples compared, scales for comparing said samples mounted on said frame, and optical means projecting an image of said scales into said eye piece.

2. In a colorimeter, a frame, an eye piece mounted on said frame for receiving the light from the color samples compared, scales for comparing said samples mounted on said frame, optical means projecting an image of said scales into said eye piece and means for selectively admitting light from the color samples or projecting the image of said scales into said eye piece.

3. In a colorimeter, a frame, adjustable means on said frame supporting the color samples to be compared, scales operatively connected with said means, an eye piece on said frame, and an optical system interposed between said eye piece, said samples and a second optical system interposed between said eye piece and said scales and selective means to cause the projection of light from said samples or the projection of the image of said scale into said eye piece thru said optical systems.

4. In a colorimeter, a frame, adjustable means on said frame supporting the color samples to be compared, scales operatively connected with said means, an eye piece on said frame, shiftable optical means between said eye piece and said adjustable means and between said eye piece and said scales to selectively admit light from said samples into said eye piece or project an image of said scales into said eye piece.

5. In a colorimeter, a frame, adjustable means on said frame supporting the color samples to be compared, scales operatively connected with said means, an eye piece on said frame, a prism refracting light from said color samples into said eye piece, an optical system projecting an image of said scales, and means for selectively refracting light from said color samples by means of said prism or projecting an image of said scales by means of said optical system into said eye piece.

6. In a colorimeter, a frame, adjustable means in said frame supporting the color samples to be compared, scales operatively connected with said means, an eye piece on said frame, a prism refracting light from said color samples into said eye piece, and means moving said prism into a position, in which it projects an image of said scales into said eye piece.

7. In a colorimeter, a frame, adjustable means on said frame supporting the color samples to be compared, scales operatively connected with said means, an eye piece on said frame, a prism refracting light from said color samples into said eye piece, an optical system projecting an image of said scales, and means for selectively locating said prism or said system relative to said eye piece.

8. In a colorimeter, a frame, adjustable means on said frame supporting the color samples to be compared, scales operatively connected with said means, an eye piece on said frame, shiftable means, a prism refracting light from said color samples into said eye piece, and an optical system projecting an image of said scales, into said eye piece carried by said shiftable means.

9. In a colorimeter, a frame, adjustable means on said frame supporting the color samples to be compared, scales operatively connected with said means, an eye piece on said frame, a prism refracting light from said color samples into said eye piece, an optical system projecting an image of said scales into said eye piece on an optical scale differing from that in which the light from said color samples is transmitted to said eye piece.

10. In a colorimeter, a frame, adjustable means on said frame supporting the color samples to be compared, scales operatively connected with said means, an eye piece on said frame, a prism refracting light from said color samples into said eye piece, an optical system projecting an image of said scales into said eye piece and reversing the image of the sides of said scales in the field of vision through said eye piece.

11. In a colorimeter, a frame, adjustable means on said frame supporting the color samples to be compared, scales operatively connected with said means, an eye piece on said frame, light refracting means and image projecting means, and means selectively interposing said light refracting and image projecting means between said eye piece and said samples, and between said eye piece and said scales.

12. In a colorimeter, a frame, adjustable means on said frame supporting the color samples to be compared, scales operatively connected with said means, an eye piece on said frame, a carrier, a prism refracting light from said color samples into said eye piece mounted on said carrier, and a movable optical system for projecting an image of said scales into said eye piece and reversing the image of the sides of said scales in the field of vision through said eye piece and means for moving said carrier to substantially substitute the image of said scales for said samples in the field of vision of said eye piece.

13. In a colorimeter, a frame, adjustable means on said frame supporting the color samples to be compared, scales operatively connected with said means, an eye piece on said frame, a movable prism refracting light from said color samples into said eye piece, and an optical system including said prism for projecting an image of said scales into said eye piece and reversing the image of the sides of said scales in the field of vision through said eye piece and for substantially substituting an image of said scales for said samples in the field of vision of said eye piece on the movement of said prism.

14. In a colorimeter comprising a frame having adjustable supporting means for the comparison of samples, a single eye piece, a double refracting system carried by said frame, said double refracting system being arranged with relation to said eye piece and the supporting means so as to simultaneously refract light rays from a plurality of samples into said eye piece, scales carried by said frame and operatively connected with said adjustable supporting means and means for bringing the image of said scales in the field of vision of said single eye piece.

15. In a colorimeter the combination as set forth in claim 14 including an optical system and means for shifting said optical system to project the image of said scales into said eye piece.

16. In a colorimeter the combination as set forth in claim 14 including an optical system and means cooperating with said optical system to reverse the position of the projected image of said scale in said eye piece and locate said image in relatively the same position in said eye piece which the scales occupy with relation to the supporting means of the samples.

ARNO SCHMIDT.